(12) United States Patent
Conners

(10) Patent No.: US 7,745,779 B2
(45) Date of Patent: Jun. 29, 2010

(54) COLOR PIXEL ARRAYS HAVING COMMON COLOR FILTERS FOR MULTIPLE ADJACENT PIXELS FOR USE IN CMOS IMAGERS

(75) Inventor: Gary H. Conners, Rochester, NY (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 12/028,223

(22) Filed: Feb. 8, 2008

(65) Prior Publication Data
US 2009/0200451 A1 Aug. 13, 2009

(51) Int. Cl.
H01J 40/14 (2006.01)
H01J 5/16 (2006.01)
G01J 3/50 (2006.01)

(52) U.S. Cl. .................. 250/226; 250/208.1; 348/279; 257/432

(58) Field of Classification Search .............. 250/208.1, 250/214.1, 214 R, 216, 226; 348/278–282, 348/294; 257/431, 432
See application file for complete search history.

(56) References Cited

U.S. PATENT DOCUMENTS

| | | | |
|---|---|---|---|
| 3,971,065 A | 7/1976 | Bayer | |
| 5,506,618 A * | 4/1996 | Yoneyama et al. | 348/234 |
| 6,057,586 A | 5/2000 | Bawolek et al. | |
| 6,350,979 B1 | 2/2002 | Jing | |
| 6,421,084 B1 | 7/2002 | Chang et al. | |
| 6,999,119 B1 * | 2/2006 | Shibazaki et al. | 348/273 |
| 7,233,350 B2 | 6/2007 | Tay | |
| 2005/0001144 A1 * | 1/2005 | Cartlidge et al. | 250/208.1 |
| 2005/0057671 A1 | 3/2005 | Cole et al. | |
| 2007/0045642 A1 | 3/2007 | Li | |
| 2007/0159544 A1 | 7/2007 | Hu | |

FOREIGN PATENT DOCUMENTS

WO PCT/US2005/030256 * 8/2005

OTHER PUBLICATIONS

K.M. Findlater et al., "A CMOS Image Sensor With A Double-Junction Active Pixel", IEEE Transactions on Electron Devices, 2003, pp. 1-11.
P.B. Catrysse et al., "Roadmap for CMOS image sensors: Moore meets Planck and Sommerfeld", SPIE-IS&T, vol. 5678, 2005, pp. 1-13.

* cited by examiner

*Primary Examiner*—Thanh X Luu
*Assistant Examiner*—Francis M Legasse, Jr.
(74) *Attorney, Agent, or Firm*—RatnerPrestia (57) ABSTRACT

Image sensors and methods of operating image sensors. An image sensor includes an array of pixels and an array of color filters disposed over the array of pixels such that each different color filter is disposed over multiple pixels. A method of operating an image sensor including an array of two by two blocks of single color pixels includes determining a level of incident light, determining an incident light value corresponding to the level of incident light and comparing the incident light value to a predetermined threshold value. If the incident light value is less than the predetermined threshold value, a combined signal is read from the two by two blocks. If the incident light value is less than the predetermined threshold value, an individual signal is read from each pixel.

14 Claims, 10 Drawing Sheets

COLOR PIXEL ARRAYS HAVING COMMON COLOR FILTERS FOR MULTIPLE ADJACENT PIXELS FOR USE IN CMOS IMAGERS

BACKGROUND OF THE INVENTION

In general, the present invention relates to novel color pixel arrays for use in CMOS imagers.

Imagers, including complimentary metal oxide semiconductor (CMOS) imagers and charge-coupled devices (CCDs), may be used in digital imaging applications to capture scenes. An imager includes an array of pixels. Each pixel in the array includes at least a photosensitive element for outputting a signal having a magnitude proportional to the intensity of incident light contacting the photosensitive element. When exposed to incident light to capture a scene, each pixel in the array outputs a signal having a magnitude corresponding to an intensity of light at one point in the scene. The signals output from each photosensitive element may be processed to form an image representing the captured scene.

In one CMOS imager design, each pixel further includes a floating diffusion region for temporarily storing a signal from the photodiode, a reset transistor for resetting the floating diffusion region and the photodiode, a select transistor for selecting a pixel for read out and a source follower transistor for reading out the level of the pixel. Using this design, each pixel produces a signal, which is read out individually on an output line at a respective collection point. Each signal is then processed to form an image.

To capture color images, the photo sensors should be able to separately detect photons of wavelengths of light associated with different colors. For example, a photo sensor may be designed to detect first, second, and third colors (e.g., red, green and blue photons). To accomplish this, each pixel in the array of pixels may be covered with a single color filter (e.g., a red, green or blue filter). The single color filters may be arranged into a pattern to form a color filter array ("CFA") over the array of pixels such that each individual filter in the CFA is aligned with one individual pixel in the array. Accordingly, each pixel in the array may detect the single color of light corresponding to the filter aligned with it.

DETAILED DESCRIPTION OF THE INVENTION

Figure 1:
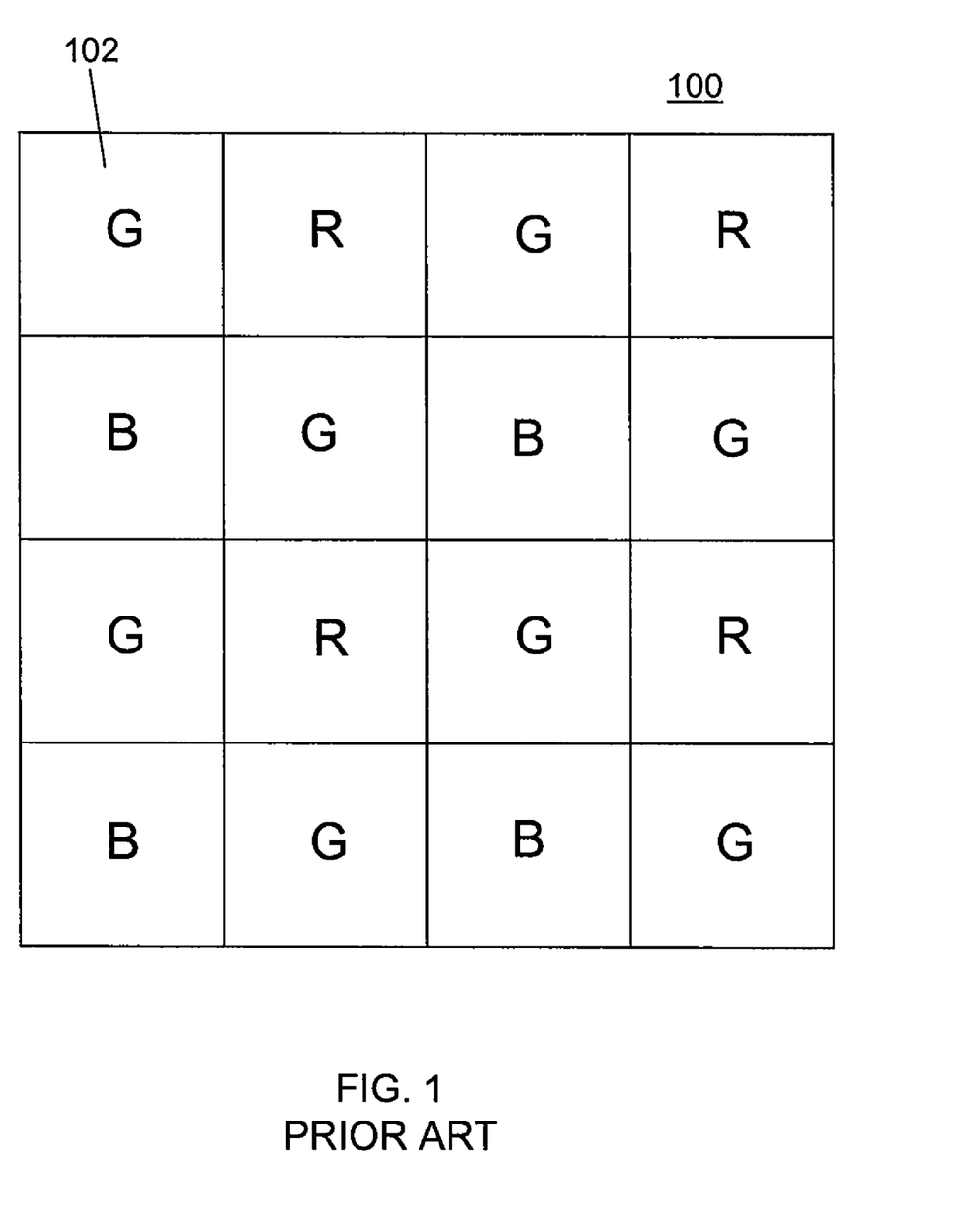
FIG. 1 is a diagram of a conventional color filter array.

One example CFA pattern is the Bayer CFA. A 4×4 array portion 100 of a Bayer CFA is shown in FIG. 1. As shown, array portion 100 consists of rows of alternating green and red color filters and alternating blue and green color filters. Each color filter 102 corresponds to one pixel in an underlying pixel array.

In the Bayer CFA shown in FIG. 1, half of the color filters are green color filters, one quarter of the color filters are blue color filters and one quarter of the color filters are red color filters. The use of twice as many green filters as red and blue filters, respectively, imitates the human eye's greater ability to see green light than red and blue light.

Each pixel in the Bayer CFA is sensitive to a different color of light than its closest neighbors. As shown in FIG. 1, for example, the nearest neighbors to each green filter are red and blue filters, the nearest neighbors to each red filter are green filters and the nearest neighbors to each blue filter are green filters. Because each filter's closest neighbors have different color designations than it, each filter overlies only one corresponding pixel.

As pixels are made smaller and smaller, it is more difficult to manufacture the filter elements. It is also more difficult to align the filter elements with their corresponding pixels. Further, because the pixels are so small, their light sensitivity is decreased relative to larger pixels. Accordingly, at low levels of incident light, signals read from the smaller pixels may have undesirably low signal to noise ratios.

Figure 2:
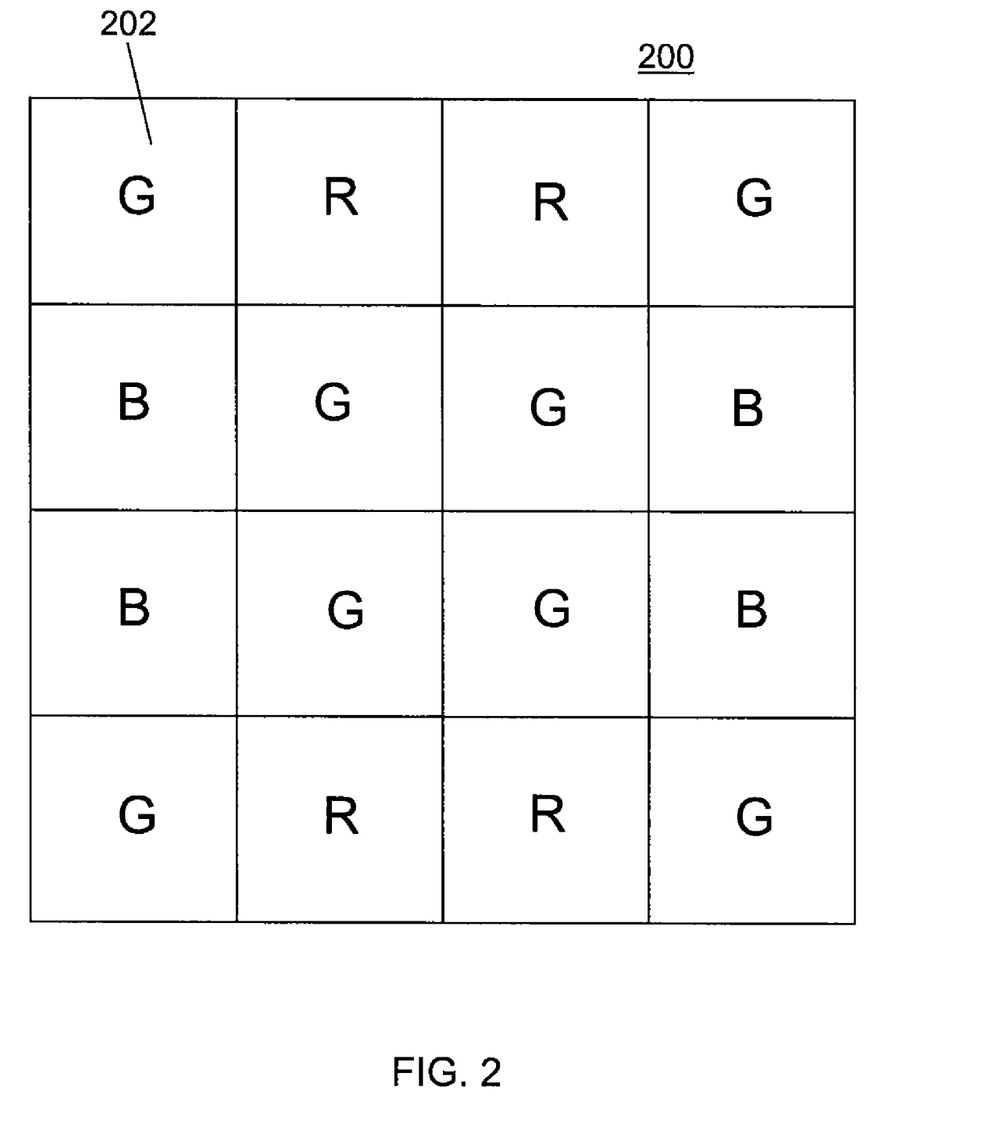
FIGS. 2 and 2A are diagrams of a 4×4 region and a 5×5 region of a color filter array, respectively.

FIG. 2 shows an example 4×4 array portion 200 of a pixel array. Color designations for each pixel are depicted by the letters G, R and B, which represent the colors green, red and blue, respectively. The pixel array portion 200 may be repeated to form an array of any number of rows and columns of pixels arranged in the basic pattern shown. As shown in FIG. 2, each pixel 202 has closest neighbors that have the same color designation as it. For example, each green pixel element "G" has two closest neighbors that are green pixels as well. While the 4×4 array portion is shown using red, green and blue color filters, the 4×4 array portion may be implemented in other color schemes, such as a magenta, yellow and cyan color scheme.

Figure 3:
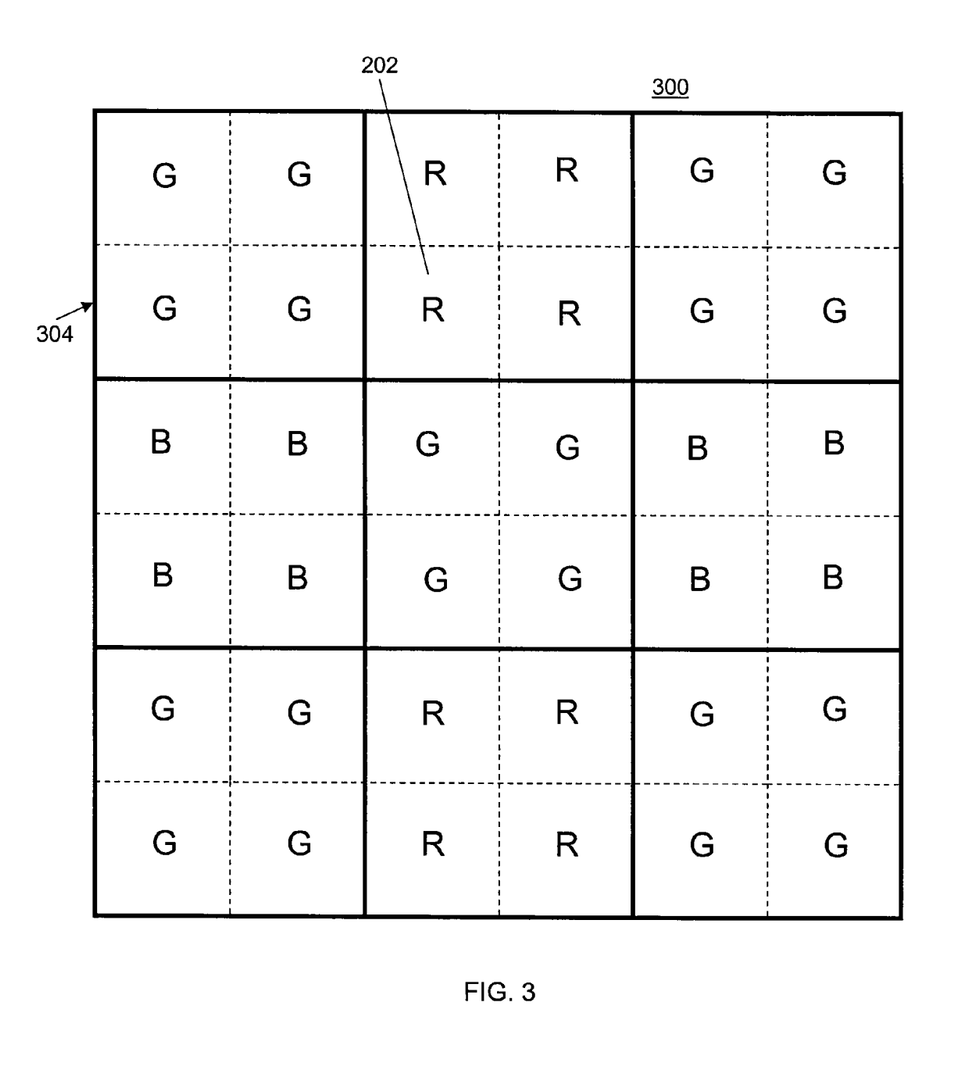
FIG. 3 is a diagram of a 6×6 region of the color filter array including the 4×4 region shown in FIG. 2 and its nearest neighbors in the array.

FIG. 3 shows an example pixel array 300, which includes pixel array portion 200 (not labeled) surrounded by its nearest neighbors in the array. Borders of underlying pixels are shown in dashed lines in FIG. 3. An example CFA is disposed over pixel array 300. Color filter borders are shown in solid lines in FIG. 3.

As shown in FIG. 3, repeated array portions 200 form an array of 2×2 blocks of pixels. Each 2×2 block has a single color designation. In this embodiment, the single color 2×2 blocks are arranged in the pattern shown in FIG. 3. Namely, the pattern consists of rows of alternating 2×2 blocks of green and red pixels and alternating 2×2 blocks of blue and green color pixels. Because pixels are arranged in 2×2 blocks of pixels having the same color designation, one filter (e.g., filter 304) in the CFA may be disposed over the four pixels in each 2×2 pixel block. Thus, as shown, each filter element 304 may have four times the area of a single pixel while still maintaining the desirable half green and one quarter each red and blue proportion of color filters in the CFA.

By way of an example, each pixel 202 may be less than or equal to two microns in width. If each pixel is two microns in width, the corresponding filter may be less than or equal to 4 microns in width, which covers 4 times the area of each individual pixel underlying the filter. Because the filters may be made 4 times as large as the underlying pixels, the filters are easier to manufacture and align with the underlying pixels.

Figure 4:
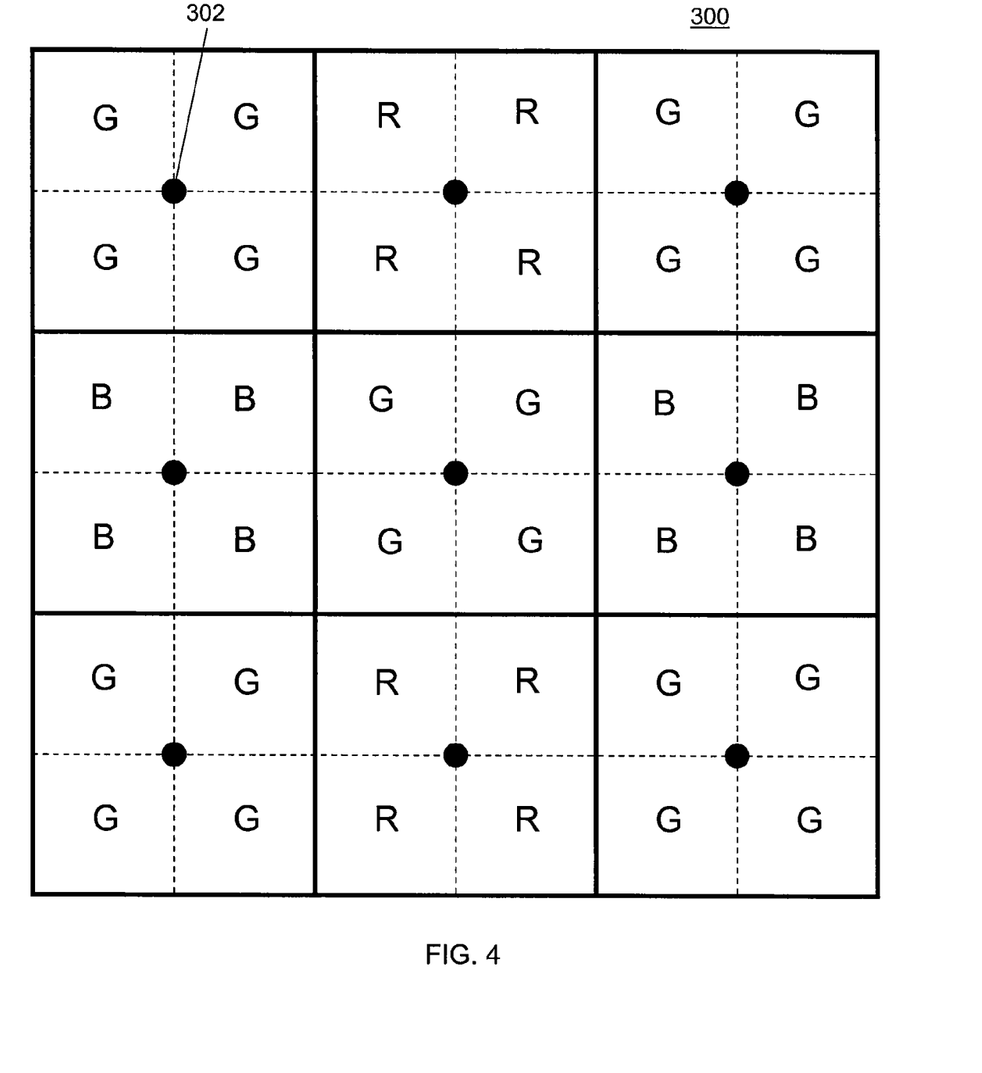
FIG. 4 is a diagram of the 4×4 region shown in FIG. 3 including collection points.

FIG. 4 shows example array 300, including collection points 302. As described above, each collection point 302 is a point from which signals are read from each pixel connected to the collection point. In the embodiment shown in FIG. 4, there is one collection point 302 for each 2×2 block of pixels. This may be accomplished, for example, using 4-way pixel multiplexing. In a 4-way multiplexed pixel structure, each individual pixel may include a photodiode and a transfer gate. The remaining transistors (e.g., floating diffusion, reset transistor and select transistor) may be shared amongst four pixels in the array. In the embodiment shown in FIG. 4, the four pixels in each 2×2 block share a common floating diffusion, reset transistor, source follower transistor and select transistor. 4-way pixel multiplexing may be accomplished in one of many ways known in the art.

Using one collection point to read signals from each of the four pixels in each 2×2 group of pixels provides greater design flexibility. For example, the pixels in each 2×2 group may be read out individually or may be combined and read out together.

By way of an example, to read out the pixels sequentially, a row of pixels may be selected for readout and then each pixel in the row may be read out sequentially. The processing proceeds row by row until all pixels are read out. For the first pixel in the row, the shared floating diffusion is reset by applying a high transfer signal to the transfer gate line coupled to the pixel and to the shared reset transistor. This turns on the shared reset transistor and the transfer gate for the first pixel in the row to clear charge out of the photodiode and the shared floating diffusion. The photodiode may then be exposed to incident light for an exposure period. Prior to reading out the level of the photodiode, the reset level on the shared floating diffusion may be reset and its level read out and temporarily stored for use in a correlated double sampling (CDS) operation. After the reset operation, the pixel's transfer gate may be turned on to transfer the charge from the photodiode to the shared floating diffusion. The stored charge may then be read out on an output line connected to a collection point 302 (shown in FIG. 4). The read out value may be processed with the temporarily stored reset level by the CDS operation. Throughout this processing, a low signal may be applied to the transfer gate lines coupled to the other three pixels in the 2×2 group to which the first pixel belongs to maintain these transfer gates in an off state. This isolates the above-described operations to the first pixel.

To read out the pixels collectively, according to one embodiment, the processing is similar to reading out the pixels individually except that all four pixels in a 2×2 group are read out simultaneously. To accomplish this, the respective transfer gates coupled to all four pixels in the group may be turned on at the same time. The result is that a combined signal is read out for each 2×2 group, which represents the levels of incident light measured by all 4 pixels in the group. The processing then continues the same way as for reading out the pixels individually except with the processing occurring simultaneously for all four pixels. In alternative embodiments, signals may be read out from each pixel in the 4×4 group and then the signals may be combined using either digital or analog logic depending on design goals.

Figure 5:
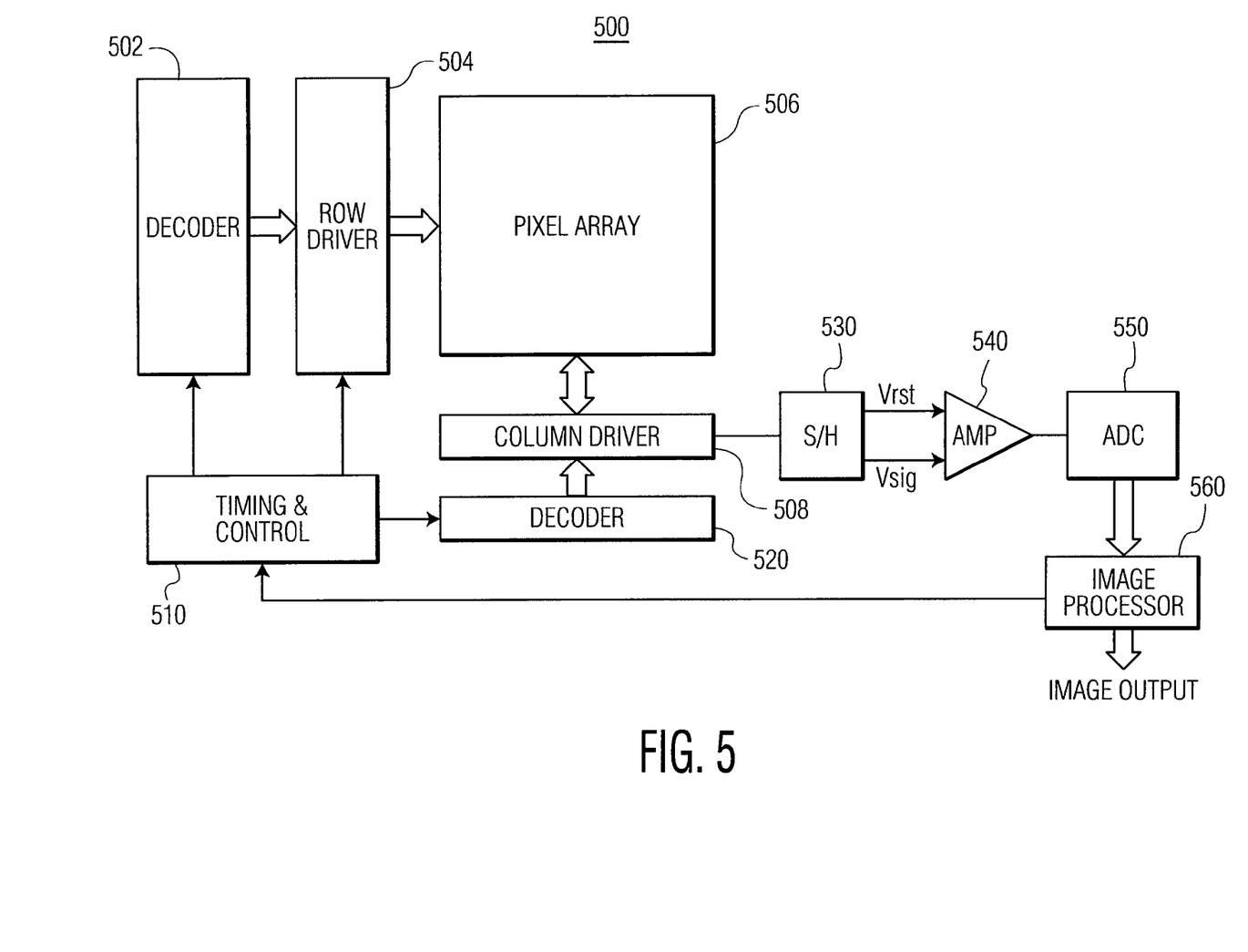
FIG. 5 is a block diagram of a system portion.

FIG. 5 depicts an example system portion 500 which includes the color pixel array described in the above embodiments (depicted as pixel array 506). Example system portion 500 may be configured to read out pixels individually or collectively, as described above. In addition to pixel array 506, the example system portion 500 includes a decoder 502, a row driver 504, a timing and control unit 510, a column driver 508, a decoder 520, sample and hold capacitors 530, an amplifier 540, an analog to digital converter (ADC) 550 and an image processor 560. Row driver 504 may selectively activate the shared select transistors in response to row address decoder 502. In this way, a row and address may be provided for each pixel. Timing and control unit 510 controls address decoders 502 and 520 for selecting the appropriate row lines for pixel readout and row and column driver circuitry 504 and 508, which apply driving voltage to the drive transistors of the selected row lines.

During the individual and combined readout processes described above, signals representing the shared floating diffusion level(s) and pixel photodiode level(s) may be temporarily stored on sample and hold capacitors 530, as described above. Differential amplifier 540 subtracts the floating diffusion signal from the photodiode signal and ADC 550 converts the resulting signal to a digital signal. Image processor 560 performs some processing on the image signals read from the pixels and outputs an image signal representing the captured scene.

In one embodiment, the pixel array may be operated in either a normal light mode or a low light mode. In the normal light mode, the pixels are read out individually. In the low light mode, the pixel signals are read out collectively. Thus, in the low light mode, the pixels are effectively made four times larger, which increases the sensitivity of the pixels. Because of this increased sensitivity, signals read out from the larger pixels in the low light mode may have higher signal to noise ratios in low light levels than the smaller pixels would.

The pixel array (including the CFA described above) may be configured to transition between normal light mode and low light mode, depending on the level of light incident on one or more designated pixels in the array. In one embodiment, to transition between normal and low light modes, system portion 500, under control of timing and control unit 510, is configured to carry out the steps provided in FIG. 6.

Figure 6:
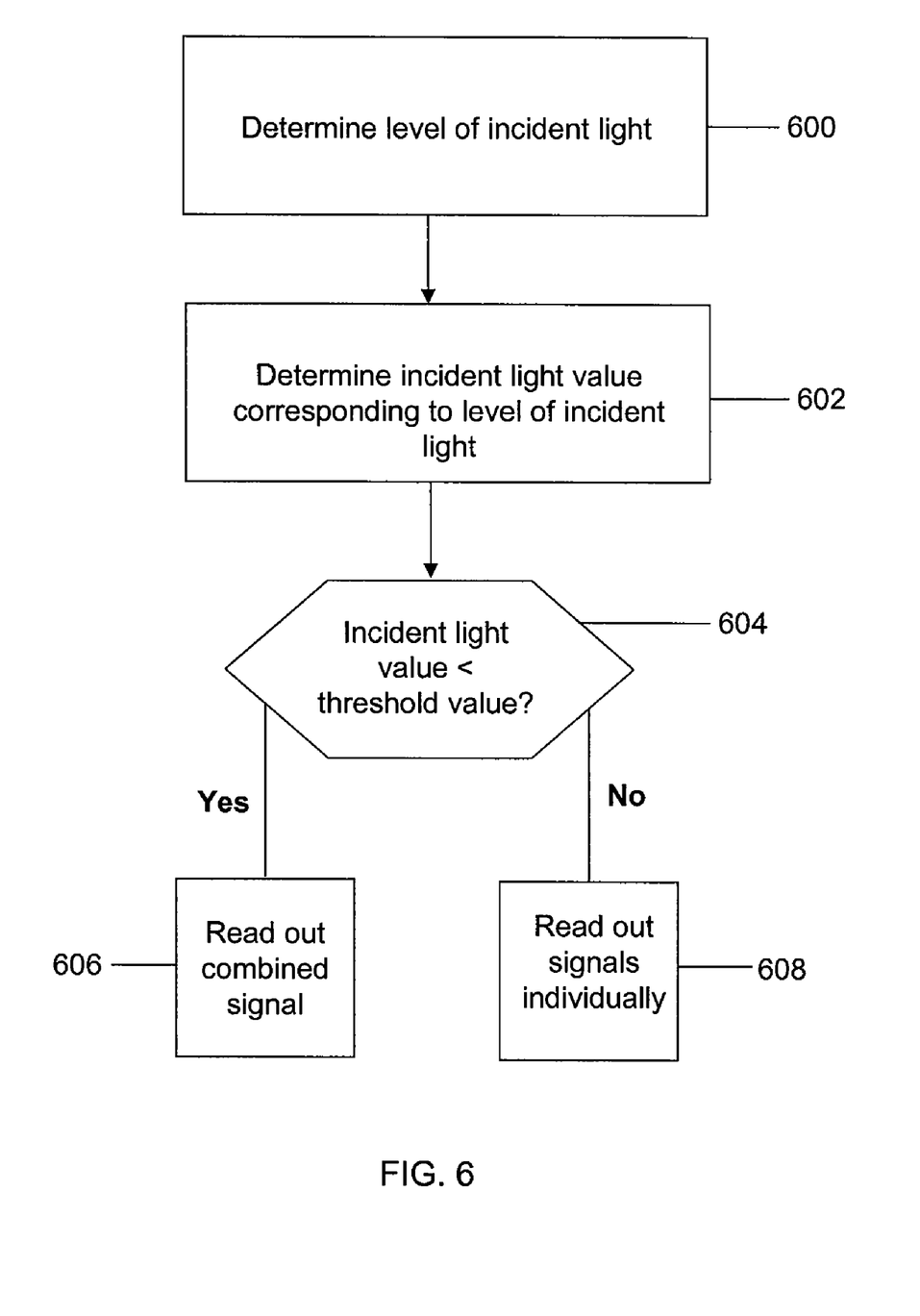
FIG. 6 is a flow chart of steps executed by the system portion of FIG. 5.

In step 600, one or more designated pixels in the array 506 sense a level of the incident light. This step may occur when a system incorporating the array is first turned on, before or after each picture is taken, or periodically while the system is in an on state. In step 602, the image processor 560 determines an incident light value corresponding to the sensed level of incident light using methods known in the art. In step 604, the image processor 560 compares the incident light value with a predetermined threshold value to determine whether the incident light value is less than the predetermined threshold value. The predetermined threshold value may be a value representing a level of incident light at a border between low and normal light levels. If the incident light value is less than the predetermined threshold value, processing proceeds at step 608 where the timing and control unit 510 operates in the low light level mode. If not, processing proceeds to step 608 where the control unit 510 operates in the normal light level mode. In an alternative embodiment, a separate imager or pixel array may be used to sense the level of ambient light in the vicinity of the system in step 600. The remaining steps would be carried out the same as for when pixels in the array are used to sense the level of incident light.

In another embodiment, different regions in the pixel array may operate in different modes depending on the level of light incident on each region. In this embodiment, one or more pixels in one or more regions may be configured to sense a level of light incident on the pixel(s). To transition between low light and normal modes of operation, the steps shown in FIG. 6 and described above may be carried out, but for one or more pixels in one or more regions of the array rather than for the array as a whole.

A pixel array may be broken into any number of regions in any number of different ways, depending on the design constraints of the system incorporating the array. FIGS. 7A-7D show some example embodiments of pixel arrays broken into regions.

Figure 7A:
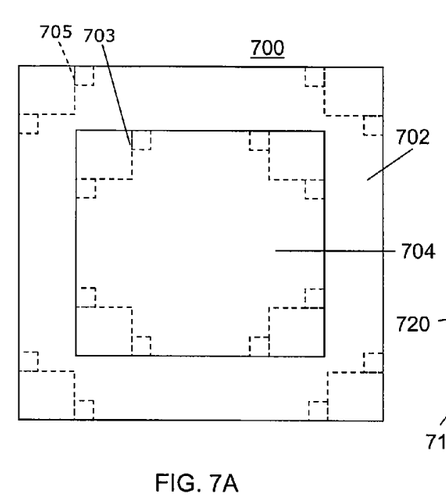
FIGS. 7A, 7B, 7C and 7D are diagrams of the array broken into regions which are operable in different modes of operation.

In the embodiment shown in FIG. 7A, array 700 is broken into two regions: a perimeter region 702 and a central region 704. Using the arrangement shown in FIG. 7A, one region may operate in a low light mode while the other operates in a normal mode or one or both regions may transition between modes.

For example, one or more pixels in perimeter region 702 may sense the level of the incident light in step 600 of FIG. 6. In this example, central region 704 may always operate in normal level mode. Alternatively, one or more pixels in central region 704 may sense the level of the incident light. Alternatively, perimeter region 702 may be configured to always operate in low light level mode. In this embodiment, central region 704 may include one or more pixels which sense the level of the incident light. Alternatively, perimeter region 702 may always operate in low level mode and central region 704 may always operate in normal light level mode.

As shown in phantom in FIG. 7A, regions that are operable in normal light mode (e.g., perimeter region 704) may include areas 703 in the corners that are operable in low light mode. Furthermore, the low-light region 702 may include areas 705 in its corners that operate in a very low light mode (i.e., a lower light mode than the low-light mode). Regions 703 and 705 may, for example, approximate circular patterns and, thus, compensate for a circular lens that focuses more light on a central region of the imager 700 than on a peripheral portion. If the low-light regions combine 4 pixels, the very low-light regions may, for example, combine nine pixels.

Figure 7B:
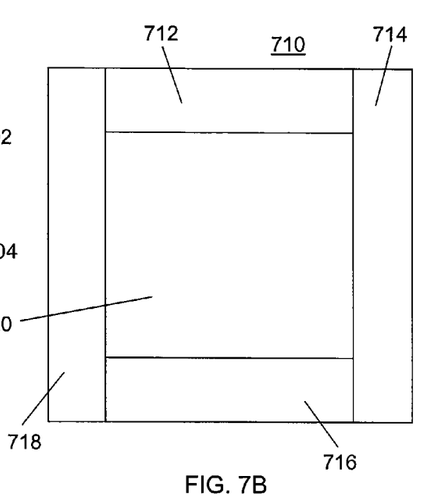

The embodiment shown in FIG. 7B is a variation on the embodiment shown in FIG. 7A. In this embodiment, the perimeter region of array 710 is broken up into four regions: a first perimeter region 712, a second perimeter region 714, a third perimeter region 716 and a fourth perimeter region 718. The array also includes a central region 720. In this example, if each perimeter region is configured to switch between low and normal light modes, one or more pixels in each of the first, second, third and fourth perimeter regions 712, 714, 716 and 718 sense a level of the incident light in step 600 of FIG. 6. Thus, each region 712, 714, 716 and 718 is independently operable in either low or normal light mode. Central region 720 is operable in any of the ways mentioned with respect to central region 704 above.

Figure 7C:
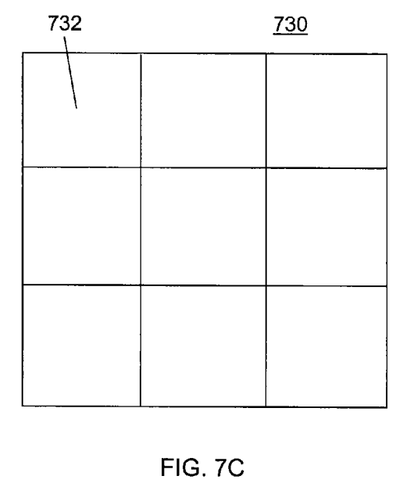
Figure 7D:
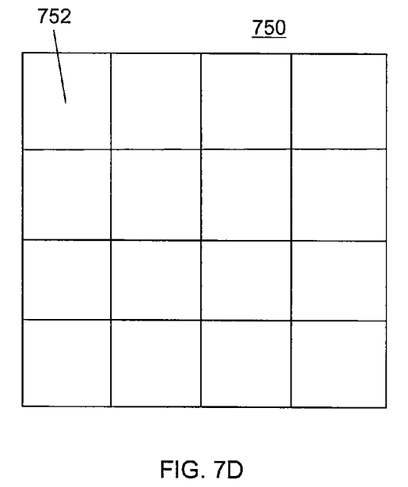

In the embodiments depicted in FIGS. 7C and 7D, arrays 730 and 750 are respectively broken into a number of equally sized regions. In FIG. 7C, array 730 is broken into nine equally sized regions 732 and array 750 is broken into 16 equally sized regions 752. In these examples, one or more pixels in each region may be configured to sense the level of the incident light in step 600 of FIG. 6. While these examples show the regions as being equally sized, the regions may be unequally sized. Further, while these examples show nine and sixteen regions, any number of regions may be used.

When some region(s) of the array are configured to switch between modes and other region(s) of the array are configured to operate only in normal light level mode, pixels in the 2×2 blocks operating in low light level mode may undergo some form of interpolation to derive signal values for each pixel in the 2×2 groups. For example, the signal values for each pixel in the 2×2 group may be averaged with adjacent pixels from other groups. Interpolation may also be used to smooth the transition between regions of the image in normal light mode and regions in low light mode. This may be done, for example, by filtering pixels on or near the border between the two regions through a spatial low-pass filter. The interpolation processing on the low-light image pixels and on the boundary pixels may be performed by the image processor 560, shown in FIG. 5. Other forms of interpolation are well known in the art.

Figure 2A:
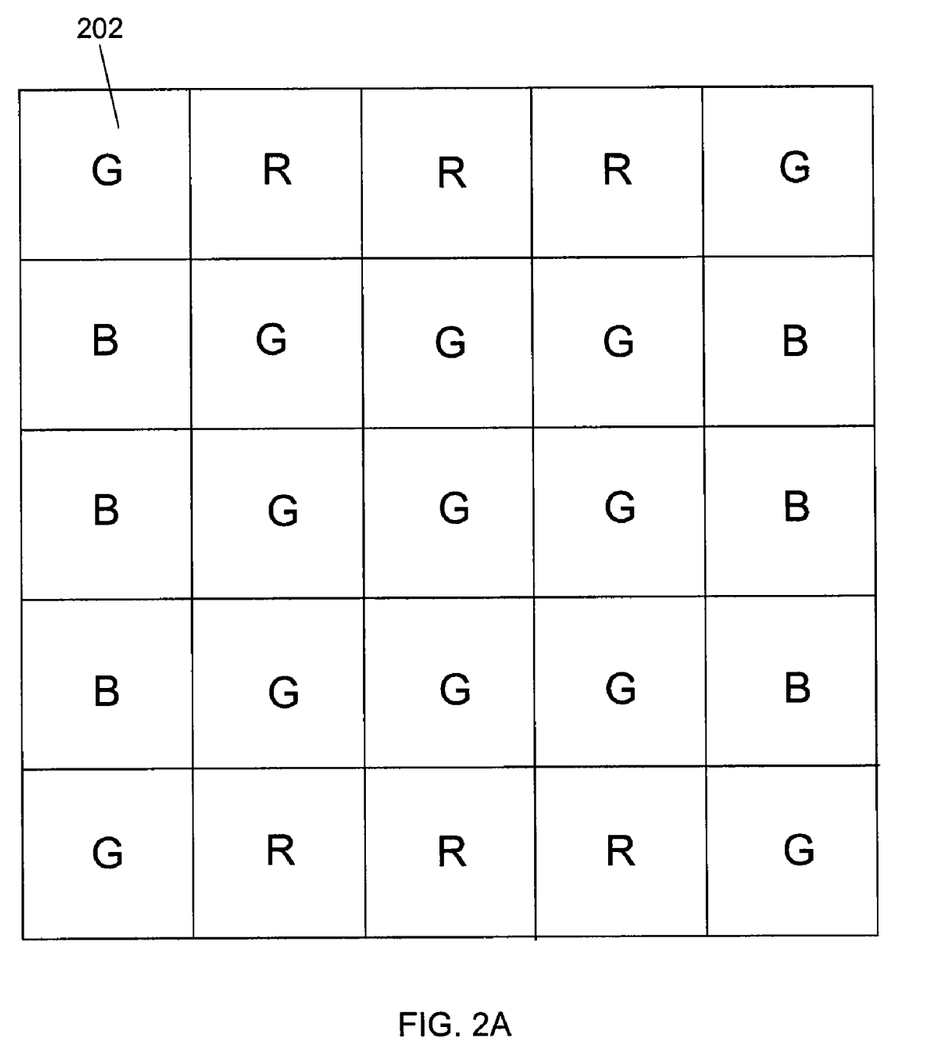

While the above embodiments are described in terms of 2×2 groups of pixels having the same color designation, embodiments of the present invention include CFAs that incorporate larger blocks (e.g., 3×3, shown in FIG. 2A, and 4×4 blocks, not shown) of same-color pixels under the same color filter. While use of larger groups may result in degradation in image quality, use of larger groups may be desirable for use in applications that operate in extremely low light levels (e.g., in cameras that will be used in deep water or in caves). Using the larger groups, more pixel signals may be combined during or after readout (as described above) to further increase the signal to noise ratio in images captured in extreme low light environments.

Figure 8:
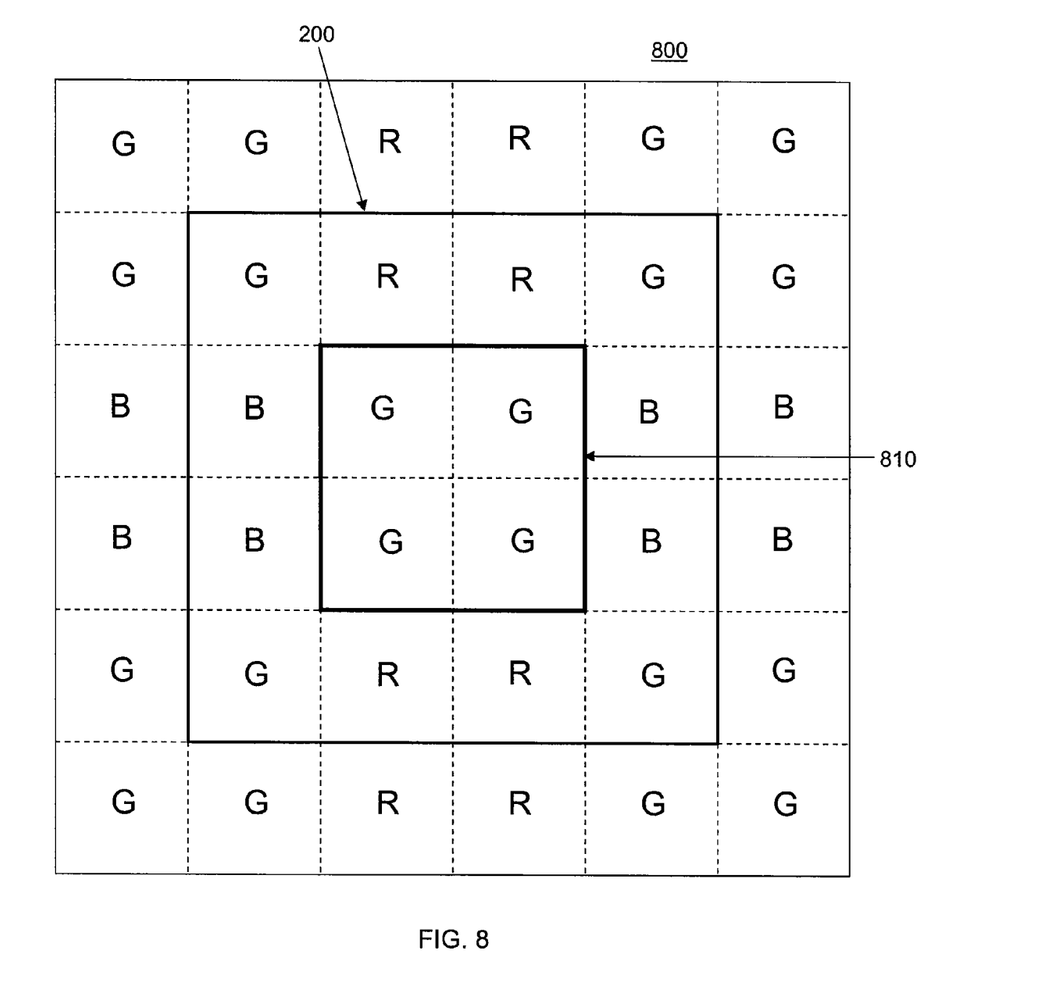
FIG. 8 is a diagram of a 6×6 region of the color filter array including the 4×4 region shown in FIG. 3 and a color filter which has special properties.

FIG. 8 shows a 6×6 array portion 800 of a pixel array according to another embodiment. Region 800 is similar to array portion 300 shown in FIG. 3 except some of the color filters in the CFA have special properties. As shown, array portion 800 includes the basic 4×4 array portion 200 of pixels (e.g., pixel 202) of FIG. 2. Color filter 810 is shown in bold and represents the central color filter in each repeated 4×4 array portion 200.

In one embodiment, color filter 810 for each 4×4 array portion 200 in an array may be made to have a lower optical density than normal green filters (e.g., a "light green" filter). Thus, filter 810 may allow more light to impinge on the underlying pixels than would a normal green filter. This would allow the underlying pixels to provide a higher resolution image in low levels of light than would a normal green filter because less light would be blocked by the filter.

While signals read from the pixels underlying color filters 810 could be combined in a low light level mode of operation, doing so may not be desirable because it may result in degradation of picture quality. Accordingly, pixels underlying low-density color filters 810 would most likely be configured to always operate in normal light level mode. However, in an embodiment similar to the embodiment shown in FIG. 7A, low-density color filters 810 may be used in the perimeter region 702 and normal green filters may be used in the central region 704 in order to account for typically low levels of light at the perimeter of most images. Alternatively, low-density color filters 810 may be used through the entire array, which may be particularly useful in applications which operate under extremely low levels of light. In all of the embodiments employing low-density color filters, the image processor 560 may adjust the color and/or saturation of the pixel so that it matches the color and saturation of the corresponding pixels with higher-density filters.

In an alternative embodiment, color filter 810 for each 4×4 region 200 in an array may be made to transmit a broader spectrum of light to the underlying pixels than a normal green color filter. For example, color filter 810 may be configured to transmit some blue and red light in addition to the green light a normal green color filter transmits. In the extreme, color filter 810 may be configured to transmit the full spectrum of visible light ("white light") to the underlying pixels. In other words, color filter 810 would be completely transparent).

As with the lower optical density color filter, pixels underlying color filters 810 that transmit a broader spectrum of light to the underlying pixels would most likely be configured to always operate in normal light level mode. However, in an embodiment similar to the embodiment shown in FIG. 7A, color filters 810 may be used in the perimeter region 702 and normal green filters may be used in the central region 704 in order to account for typically low levels of light at the perimeter of most images. Alternatively, color filters 810 may be used through the entire array, which may be particularly useful in applications which operate under extremely low levels of light.

Figure 9:
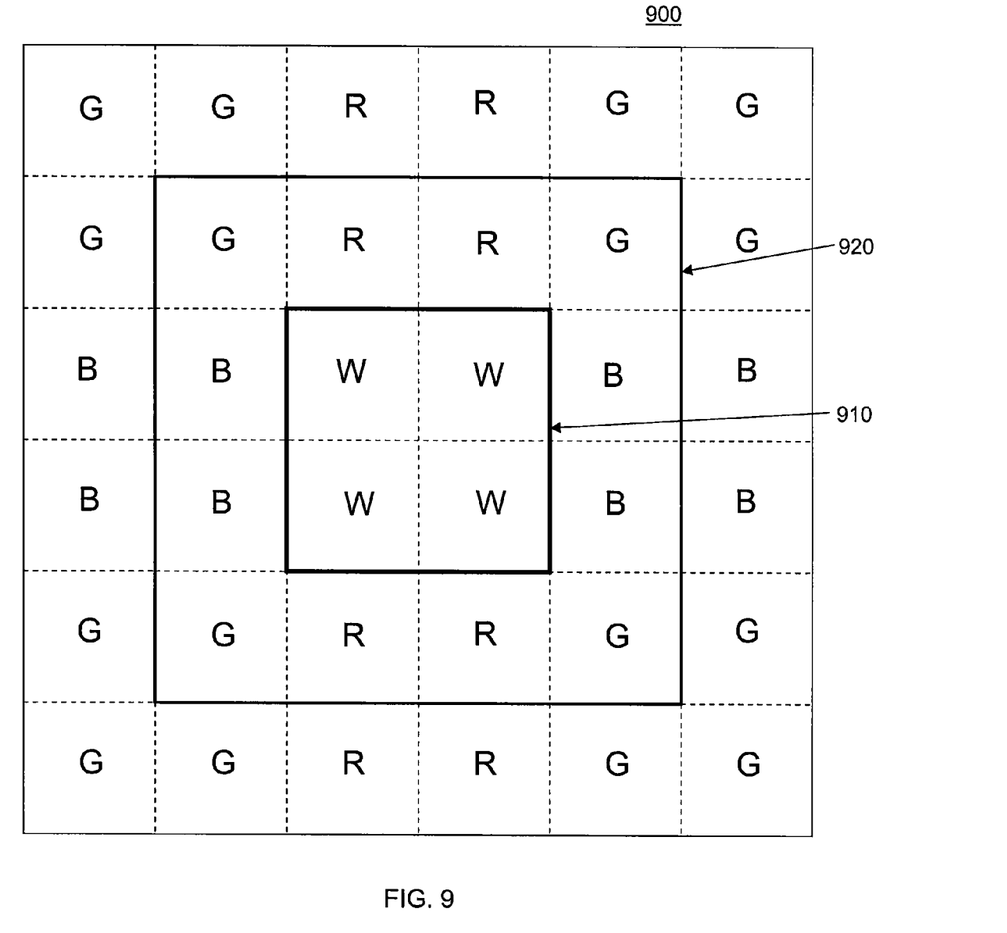
FIG. 9 is a diagram of the 4×4 region shown in FIG. 3 incorporating a fourth color designation.

FIG. 9 shows another embodiment in which a fourth color is incorporated into the 4×4 array portion 920 of the array 900. In the embodiment shown, a 2×2 block of pixels labeled "W" replaces the central 2×2 block of green pixels in 4×4 array portion 200. Here, W stands for white or unfiltered light. In this embodiment, a filter 910, which transmits white light, is disposed over each 2×2 block of white pixels. The white filter 910 is in all respects the same as the transparent filter 810 described above with respect to FIG. 8. In the embodiment shown, however, the white pixels are disposed in the central block in each 4×4 array portion 920. This provides for an image with an increased resolution, while still allowing some green pixels to remain in the CFA. While this embodiment shows the fourth color being white, any fourth color (e.g., green with some blue and/or red or yellow with some cyan and/or magenta) may be used as the fourth color.

In embodiments employing a fourth color filter, conventional interpolation techniques may be used to assign red, green and blue signal values to each of the fourth color pixels and the fourth color pixels may be used to adjust the luminance and chrominance components of adjacent pixels.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An image sensor comprising:
an array of pixels, each pixel comprising a photosensitive element; and
an array of color filter elements configured to receive a single image, the array of color filter elements including a plurality of different color filters disposed over the array of pixels, each color filter configured to transmit one band of light,
wherein each color filter element in the array of color filter elements is disposed over multiple adjacent pixels, color filter elements of a same color are separated by at least one color filter element having a different color and each color filter element occurs multiple times in the array of color filter elements.

2. The image sensor of claim 1,
wherein each color filter element is disposed over a two by two block of pixels.

3. The image sensor of claim 1,
wherein each different color filter is configured to transmit one band of light selected from a group consisting of a first color, a second color, a third color and a fourth color.

4. The image sensor of claim 3,
wherein the fourth color is selected from a group consisting of white and light green.

5. The image sensor of claim 1,
wherein each pixel has a width between 0.5 and 2.0 microns.

6. The image sensor of claim 1,
wherein each color filter element is disposed over a three by three block of pixels.

7. The image sensor of claim 1,
wherein each color filter element is disposed over a four by four block of pixels.

8. An image sensor comprising:
an array of pixels;
a six by six sub-array of photosensitive pixels of the array of pixels, each pixel configured to be sensitive to a predetermined band of light, the six by six sub-array comprising:
a perimeter region of the six by six sub-array including a plurality of two by two blocks of adjacent pixels, the two by two blocks of adjacent pixels being configured to be sensitive to different colors, and
a central region of the six by six sub-array completely surrounded by the perimeter region, the central region including a two by two block of adjacent pixels which are configured to be sensitive to a single predetermined band of light;
first color filters disposed over the central region, the first color filters being configured to transmit the predetermined band of light corresponding to the pixels over which the first color filter is disposed; and
a plurality of second color filters disposed over each two by two block of the perimeter region, each of the second color filters configured to transmit the predetermined band of light corresponding to the pixels over which the second color filter is disposed,
wherein the first color filters have a different optical density than the second color filters; and
wherein a single color filter is disposed over each two by two block of adjacent pixels.

9. The image sensor of claim 8, wherein the first color filters have a lower optical density than the second color filters.

10. The image sensor of claim 8, wherein the first color filters are configured to transmit a broader spectrum of wavelengths of light than the second color filters.

11. An image sensor comprising:
an array of four by four blocks of adjacent pixels;
an array perimeter region comprising a number of the four by four blocks; and
an array central region comprising another number of the four by four blocks completely surrounded by the array perimeter region,
a plurality of first color filters disposed over each four by four block in the central region,
a plurality of second color filters disposed over each four by four block in the perimeter region,
wherein, the plurality of second color filters have a lower optical density than the plurality of first color filters.

12. The image sensor of claim 11, wherein for four by four blocks in the array perimeter region, the second color filters transmit a broader spectrum of wavelengths of light than the first color filters.

13. A method of manufacturing an image sensor comprising:
forming an array of two by two blocks of adjacent pixels;
forming a photosensitive element in each pixel in the array; and
forming a plurality of color filters respectively over each two by two block of adjacent pixels in the array such that a single color filter is disposed over each two by two block of adjacent pixels, each respective color filter being configured to transmit a respective band of light selected from a group consisting of a first color, a second color and a third color, wherein the bands of light transmitted by adjacent filters are different, the plurality of color filters are configured to receive a single image, color filters of a same color are separated by at least one color filter having a different color and each color filter occurs multiple times in the plurality of color filters.

14. The method of claim 13, wherein the step of forming the plurality of color filters over each two by two block of adjacent pixels in the array further comprises arranging the color filters in alternating rows of alternating first and second color filters and alternating third and first color filters.

* * * * *